United States Patent [19]
Derrwaldt

[11] 3,885,808
[45] May 27, 1975

[54] DETACHABLE AUXILIARY LOAD DISTRIBUTING ASSEMBLY

[75] Inventor: Philip A. Derrwaldt, Brookfield, Wis.

[73] Assignee: D. G. Beyer, Inc., Milwaukee, Wis.

[22] Filed: Jan. 5, 1973

[21] Appl. No.: 321,336

[52] U.S. Cl. .......... 280/81 R; 180/24.02; 280/43.23; 280/405
[51] Int. Cl. ............................................. B60g 17/00
[58] Field of Search ...... 280/43.23, 81, 150 A, 405, 280/423; 180/24.02, 14 R

[56] References Cited
UNITED STATES PATENTS

| | | | |
|---|---|---|---|
| 2,894,764 | 7/1959 | Ronk | 280/423 |
| 3,090,139 | 5/1963 | Hancock | 180/14 R |
| 3,269,748 | 8/1966 | Mazery | 280/405 |
| 3,298,706 | 1/1967 | Lyall | 280/81 |
| 3,479,049 | 11/1969 | Duecy | 280/81 |
| 3,485,505 | 12/1969 | Schmidt | 280/81 |
| 3,692,331 | 9/1972 | Vegors | 280/405 |

Primary Examiner—Robert J. Spar
Assistant Examiner—Ross Weaver

[57] ABSTRACT

A dolly including a frame and a pair of ground engaging wheels is detachably connected to the rear of an over-the-road vehicle, such as a truck-mounted mobile crane. For over-the-road transportation a portion of the load normally carried on the vehicle rear wheels is transferred to the dolly wheels by one or more fluid-actuated cylinder rams. The rams extend from the frame and bear against a fixed member on the vehicle chassis and, when actuated, exert a downward pressure onto the dolly wheels via the frame. The rams are supported on a swivel assembly, which is detachably connected to the vehicle chassis, so that the dolly can pivot vertically and horizontally relative to the vehicle chassis during travel.

12 Claims, 3 Drawing Figures

PATENTED MAY 27 1975　　　　　　　　　　　　　　　3,885,808

DETACHABLE AUXILIARY LOAD DISTRIBUTING ASSEMBLY

BACKGROUND OF THE INVENTION

This invention relates to over-the-road vehicles and, more particularly, to the distribution of the effective load carried by the rear wheels of such vehicles.

Vehicle-mounted mobile cranes, and similar vehicle-mounted equipment, typically include one or more massive counterweights to counterbalance loads being carried by a boom or similar contilevered operating equipment. The counterweight is usually located at the rear of the vehicle when the crane is positioned for over-the-road movement. Because of legal axle load limitations, the counterweight may have to be removed or an auxiliary load means is means provided to obtain an acceptable axle load distribution. Removal of the counterweight is a difficult, time-consuming task and often requires a second crane and crane operator. In the past, it has been proposed to utilize an auxiliary axle and wheel assembly at the rear of the vehicle which can be lowered to provide the required weight distribution. Many of such proposed assemblies are permanently mounted on a vehicle, thereby adding to the complexity and bulk of the overall vehicle structure, and interfere or are dead weight when the crane is in use.

SUMMARY OF THE INVENTION

An object of this invention is to provide an auxiliary load distributing assembly which can be detachably connected to an over-the-road vehicle.

Another object of this invention is to provide such an assembly which is simply arranged and can be easily connected to and disconnected from the vehicle.

A further object of this invention is to provide such an assembly which is particularly adaptable for use with a truckmounted mobile crane so that the counterweight thereof does not have to be removed for over-the-road transportation.

Further objects, aspects and advantages of the invention will become apparent to those skilled in the art upon reviewing the following detailed description and accompanying drawing.

This invention provides an auxiliary load distributing assembly for over-the-road vehicles which can be detachably connected to the rear of the vehicle and includes a dolly frame supported on ground engaging wheel means. Actuating means extends from the dolly frane and bears against a fixed member on the rear of the vehicle chassis. After connection of the dolly frame to the vehicle chassis, the actuating means is operated to exert a downward pressure on the dolly wheels and thereby transfer a portion of the load normally carried by the rear wheels of the vehicle to the dolly wheels, achieving a redistribution of the load to insure compliance with legal axle load limits for over-the-road transportation. The actuating means is connected at one end to a swivel assembly, which in turn is detachably connected to the rear of the vehicle chassis, so that the dolly can pivot vertically and horizontally with respect to the vehicle chassis during transportation.

Preferably, the dolly frame is a V-shaped frame, a pair of laterally spaced wheels are supported from the rearwardly diverging legs of the V-frame, and a pair of fluid-actuated cylinder rams provide the actuating means and are connected at one end to respective V-frame legs in the vicinity of each wheel. A adjustable T-bar support means can be provided on the V-frame to support the cylinders in a raised position upon disconnection of the swivel assembly from the vehicle chassis so the swivel assembly is held in a general position ready for reconnection to the vehicle chassis.

DESCRIPTION OF THE PREFERRED EMBODIMENTS

Figure 1:
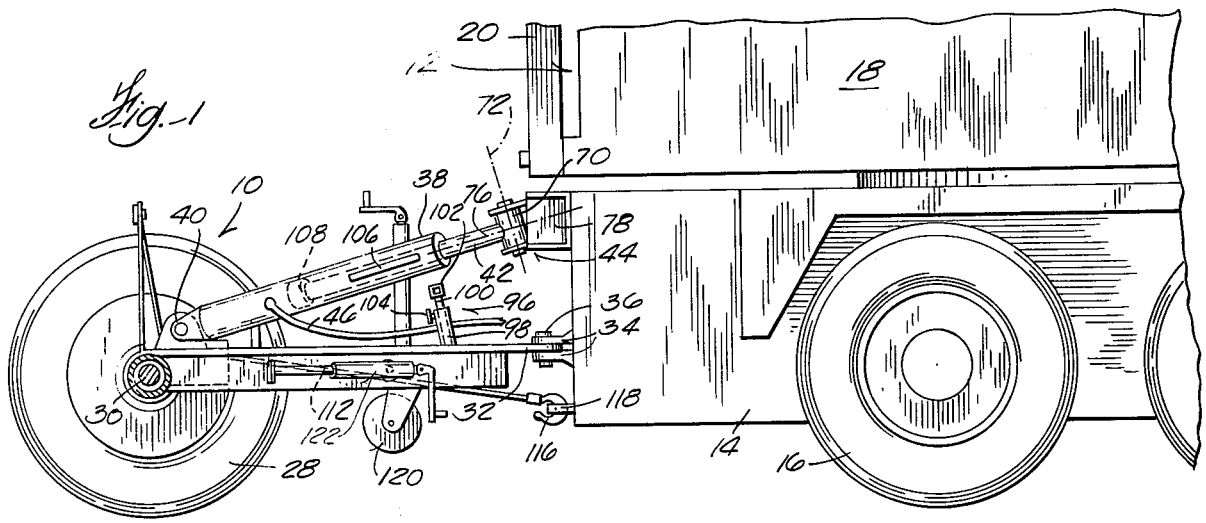
FIG. 1 is a sectioned side elevational view of an auxiliary load distributing assembly constructed in accordance with the invention shown connected to the rear of a mobile crane.
Figure 2:
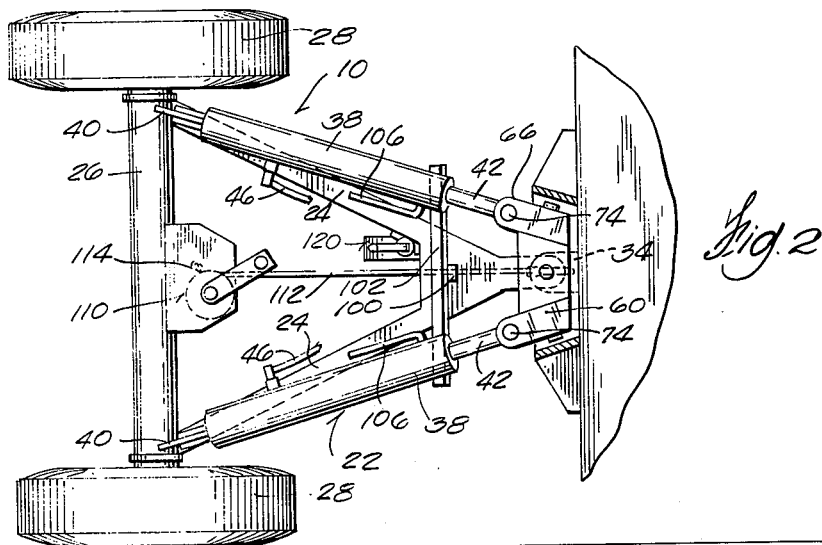
FIG. 2 is a top view of the auxiliary load distributing assembly shown in FIG. 1.

Referring to the drawings, an auxiliary load distributing assembly constructed in accordance with this invention includes an over-the-road dolly 10 connected to the rear of a truck-mounted mobile crane 12. Except for later-described means for connecting dolly 10, mobile crane 12 is of conventional design and includes a chassis frame 14 (shown fragmentarily) supported on a rear wheel and axle assembly 16, a front wheel axle assembly (not shown) and a cab portion 18 (shown fragmentarily) rotatably mounted on chassis frame 14. Cab portion 18 supports a contilivered boom (not shown) and houses a power source (not shown) and various equipment for controlling the operation of the truck and the crane (not shown). A large counterweight 20 mounted on the rear of the cab portion 18 counterbalances the tipping effect of the cantilevered boom during operation of the crane.

Dolly 10 includes a generally horizontal, V-shaped frame 22 having rearwardly diverging legs 24, a lateral member 26 extending between the rear portion of legs 24, and a pair of laterally spaced, ground-engaging wheels 28, each of which is carried on an axle 30 suitably journaled on the lateral member 26. V-frame 22 is arranged so that the spacing between the dolly wheels 28 and the mobile crane rear wheels 16 meets legal axle load requirements, e.g., 10 feet.

Extending horizontally and forwardly from the apex of V-frame 22 is a tongue 32 which is fitted between a pair of vertically spaced clevis flanges 34 affixed on the rear of chassis frame 14 for detachable connection of dolly 10 to mobile crane 12. Such connection is made inserting a pin 36 through vertically coaxial apertures in clevis flanges 34 and an aperture provided in tongue 32. Tongue 32 is free to pivot about a vertical axis provided by pin 36 so that dolly 10 can track behind mobile crane 12 during turning.

A pair of conventional hydraulically-actuated ram cylinders 38 are provided for distributing a portion of the load from the rear of chassis frame 14 onto dolly wheels 28. Cylinders 38 are of conventional construction and can be either single acting or double acting type. In the construction shown, cylinders 38 are single acting type, which is preferred because of the lower cost. One end of each cylinder 38 is pivotally mounted on an upstanding bracket 40 mounted on respective V-frame legs 24 in the vicinity of dolly wheels 28. The free ends of the cylinders 38, i.e. rods 42, are swivelably supported on a swivel assembly 44 which is detachably connected to chassis frame 14 at a location above the clevis flange 34 as explained hereinafter. Each cylinder 38 is suitably connected to the mobile crane hydraulic system (not shown) by a hose 46 or the like.

Figure 3:
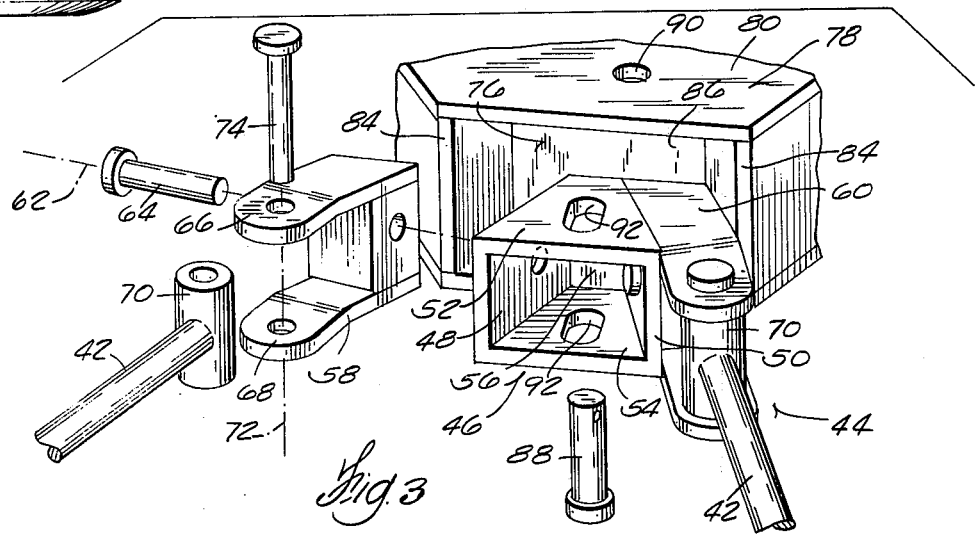
FIG. 3 is a fragmentary, exploded view of the swivel assembly.

As best shown in FIG. 3, swivel assembly 44 includes a support member 46 having rearwardly diverging sidewalls 48, 50 a top wall 52, a bottom wall 54, and a rear wall 56. Support member side wally 48, 50 diverge at an angle generally corresponding to that of V-frame legs 24. Pivot members 58, 60 are mounted on the respective support member side walls 48, 50 for pivotal movement about a generally horizontal axis 62 provided by a shaft or pin 64. Pivot members 58, 60 have rearwardly extending and vertically spaced ear 66, 68. A trunnion 70 connected to the outer end of each cylinder rod 42 is mounted between ears 66, 68 of respective pivot members 58, 60 for pivotable movement about a generally vertical axis 72 provided by a shaft or pin 74 extending through the trunnion and the ears. Ears 66, 68 are arranged so that, when swivel assembly 44 is connected to chassis frame 14, pivot axis 72 provided pin 74 is generally perpendicular to the longitudinal axis 76 of cylinders 38. Thus, when swivel assembly 44 is connected to the chassis frame 14, cylinders 38, and hence dolly 10, can pivot vertically with respect to the chassis frame about pin 64 and can pivot horizontally with respect to the chassis frame about pin 74.

Swivel assembly 44 fits into a generally rectangular opening 76 in a box-like bracket assembly 78 which is affixed to the rear of chassis frame 14 at a position above clevis flanges 34. Bracket assembly opening 76 is defined by a top wall 80, a bottom wall (hidden beneath support member 46 in FIG. 3) and side walls 84. Bracket assembly 78 can also include a back wall 86 as shown or be mounted on vehicle chassis 14 so that chassis acts as a back wall for opening 76.

A pin 88 extending vertically through apertures 90 in the top and bottom walls of bracket assembly 78 and apertures 92 in the top and bottom walls of support member 46 detachably connects swivel assembly 44 to the chassis frame. In order to assist in guiding swivel assembly 44 into place for installation of pin 90, bracket assembly 78 is preferably arranged so that the inside dimensions and configuration of opening 76 generally corresponds to the maximum outside dimensions and configuration of swivel assembly 44. As shown in FIG. 3, opening 76 is in the form of a truncated, rectangular prism. Apertures 92 in top and bottom walls of support member 46 are oversized with respect to pin 88 to facilitate the installation of pin 88. Because of the limited clearance usually exiting between the bottom of counterweight 20 and bracket assembly 78, pin 88 is preferably installed through the bottom of bracket assembly 78 as shown in FIG. 3. Pin 88 can be retained in place with a cotter pin (not shown) or similar retaining means.

After swivel assembly 44 has been fitted into bracket assembly opening 76, cylinders 38 are actuated to extend rods 42. Support member 46 bears against the inside walls of bracket assembly 78, because of the butt engagement of the swivel assembly with the chassis frame provided through the bracket assembly. Pressure is asserted onto dolly wheels 28 via brackets 40 and V-frame legs 24, to thereby transfer a portion of the load from the rear wheels 16 of the mobile crane to the dolly wheels 28 and also transfer an additional portion of the load from the rear wheels of the mobile crane to the front wheels of the mobile crane. Thus, dolly 10 provides an additional wheel system to share the load on the rear wheels of the mobile crane, and also provides a better distribution of the load on the front and rear wheels of the mobile crane, to insure compliance with legal axle limits for over-the-road travel. In addition, this load distribution improves the handling characteristics of the mobile crane.

When the cylinder pistons are under pressure after actuation, support member 46 bears against the underside of 80 and/or back wall 86 of bracket assembly 78. Thus, pin 88 acts only to hold the dolly 10 stable when cylinder pressure is relieved and is not necessary so long as the cylinders are maintained under pressure after swivel assembly 44 has fitted into bracket assembly 78. The load transferring force reacts through this butt engagement of the swivel assembly with the chassis frame with the swivel assembly accommodating vertical and horizontal movement of the dolly frame and doing so independent of the butt engagement. Thus, the load transferring connection of the dolly frame with the chassis frame and the means for accommodating vertical and horizontal movement do not interfere or restrict the design of each other, i.e. they accomplish their respective functions independent of each other.

After the mobile crane has been transported to a job site, dolly 10 can be disconnected, if desired, so that the crane can be more easily maneuvered. A T-bar support assembly 96 is provided to facilitate this disconnection and reconnection of the dolly for subsequent over-the-road transportation of the crane. Support assembly 96 includes a fixed vertical member 98 connected to the apex of V-frame 22, a telescoping vertical member 100 slidably mounted inside fixed vertical member 98, a cross member 102 pivotally mounted on slidable member 100 and a clamping means for locking the slidable member in place, such as a T-bolt 104 extending through a vertically slotted opening (not shown) in fixed member 98 and threaded into slidable member 100. Before disconnecting the dolly from the mobile crane, slidable member 100 is moved upwardly so that cross member 102 engages the underside of cylinders 38 and is then clamped in place by tightening T-bolt 104 to thereby hold the cylinders in a raised position when swivel assembly 44 is removed from bracket assembly 78. Thus, cylinders 38 are held in a position with swivel assembly 44 generally in alignment with bracket assembly opening 76 for reconnection and the operator is not required to manipulate the relatively heavy cylinders during disconnection or reconnection of the dolly.

In order to assist in the removal of swivel assembly 44 from bracket assembly 78, means are provided on the cylinders for retracting rods 42 of the single-acting cylinders 38. Although various means can be used, in the construction illustrated, such means comprises an inlet attachment 106 communicating with the upper side of the cylinder piston 108 and adapted for connection to a source of compressed air (not shown). Compressed air is admitted into both cylinders through respective inlet attachments 106 and the cylinder pistons 108 are driven downwardly to retract rods 42 and thereby pull swivel assembly 44 from bracket assembly opening 76. If double-acting hydraulic cylinders are used, the mobile crane hydraulic system can be operated in a conventional manner to accomplish the same function.

A conventional winch assembly 110 suitably supported on V-frame lateral member 26 is provided to facilitate disconnecting and/or connecting the dolly to the mobile crane, especially when the dolly is located on uneven ground. Winch assembly 110 includes a cable 112, wound onto a drum 114 and passing through the apex of V-frame 22, and a hook 116 connected on the outer end of cable 112. If the lower connecting pin 36 becomes bound during connection or disconnection, hook 116 is connected to a bracket 118 mounted on chassis frame 14 below clevis brackets 34 and the winch drum is operated in a conventional manner to draw the dolly towards the chassis frame and thereby eliminate the binding.

Suitably mounted on the front portion of V-frame 22 is a vertically retractable wheel assembly 120 which can be lowered into engagement with the ground to facilitate movement of dolly 10 after disconnection from the mobile crane. Pivotally mounted on the front portion of V-frame 22 is a vertically adjustable jack means 122 which can be pivoted (counterclockwise as viewed in FIG. 1) and then lowered into engagement with the ground to stationarily support the front end of dolly 10. By proper vertical adjustment of jack means 122, tongue 32 can be supported in an elevated position after disconnection, or raised to an elevated position, ready for connection with clevis flanges 34.

During connection of the dolly, it is generally more advantageous to first connect V-frame tongue 32 to clevis flanges 34 to hold the dolly in place. Cylinders 38 can then be partially actuated to extend cylinder rods 42 and thereby move the swivel assembly 44 into bracket assembly opening 76.

Although a preferred embodiment has been described in detail, it will be appreciated by those skilled in the art that various alterations and modifications can be made thereto without departing from the spirit and scope of the invention. For instance, a single fluid-actuated cylinder ram can be used with the appropriate modifications to the dolly frame and swivel assembly to obtain the desired transfer of a portion of the load from the vehicle rear wheels to the dolly wheels.

I claim:

1. A detachable auxiliary load distribution assembly in combination with a vehicle-mounted mobile crane which includes a frame, said load distribution assembly comprising a dolly frame;

ground engaging wheel means on and supporting said dolly frame;

means for detachably connecting said dolly frame to the rear of said mobile crane frame;

a swivel assembly adapted to be positioned in engagement with said mobile crane frame and including first means defining a generally horizontal axis for vertical movement of said dolly frame relative to said vehicle-mounted crane; and second means defining a generally vertical axis for horizontal movement of said dolly frame relative to said vehicle-mounted crane;

means interengaging between said swivel assembly and said mobile crane frame providing butt engagement of said swivel assembly with said mobile crane frame to resist movement of said swivel assembly relative to said vehicle-mounted crane, said interengaging means including a horizontally and rearwardly extending wall member affixed to said mobile crane frame and having an underside against which said swivel assembly bears; and actuating means having a first end connected to said swivel assembly and a second end connected to said dolly frame, said actuating means being operable, when actuated and when said swivel assembly is engaging said interengaging means, to react through said butt engagement of said swivel assembly with said mobile crane frame and apply a downward force on said dolly frame thereby transferring a portion of the load from said vehicle-mounted mobile crane to said wheel means and so that said vertical and horizontal movement of said dolly frame is accommodated in said swivel assembly independent of said butt engagement.

2. The assembly according to claim 1 wherein
   said dolly frame includes a structural frame having a forward portion and a rear portion;
   said wheel means is rotatably mounted on said structural frame rear portion; and
   said second end of said acutating means is connected to said structural frame and said actuating means is operable to apply pressure onto said wheel means through said structural frame.

3. The assembly according to claim 1 wherein
   said dolly frame includes a V-frame having generally horizontal, rearwardly diverging legs;
   said wheel means comprises a pair of laterally spaced wheels rotatably mounted on the rear portion of said V-frame; and
   said actuating means comprises a pair of fluid-actuated cylinder rams having a first end pivotally mounted on respective of said V-frame legs and a second end connected to said first and second axis defining means.

4. The assembly according to claim 2 wherein said means for detachably connecting said dolly frame to said vehicle includes
   flange means affixed to the rear of the vehicle chassis;
   tongue means extending from said structural frame forward portion; and
   means for detachably and pivotally mounting said tongue means to said flange means for horizontal movement of said dolly relative to said flange means.

5. The assembly according to claim 3 wherein said swivel assembly includes a support member having opposed, generally vertical side portions, a pair of pivot members, means pivotally connected to a respective one of said ram second ends in a manner to provide said vertical axis, and means pivotally mounting said pivot members on opposite side portions of said support member in a manner to provide said horizontal axis.

6. The assembly according to claim 3 including
   a winch assembly supported on said V-frame, said winch assembly including a means for linking said winch assembly to the vehicle whereby operation of said winch assembly pulls said dolly frame towards said vehicle-mounted crane.

7. A detachable auxiliary load distribution assembly in combination with an over-the-road vehicle having a frame, said auxiliary load distribution assembly comprising
   a dolly frame including a structural frame having a front portion and a rear portion;

ground engaging wheel means rotatably mounted on the rear portion of and supporting said structural frame;

means for detachably connecting the front portion of said structural frame to the rear of said vehicle;

cylinder means having a first end connected to said structural frame and a second end;

a wall member fixably connected to and extending horizontally and rearwardly from said vehicle frame;

a swivel assembly including a support member adapted to be positioned in butt engagement with and to bear against said vehicle frame and the underside of said wall member; and a pivot member pivotally connected to the second end of said cylinder means and pivotally mounted on said support member for horizontal and vertical pivot movement of said cylinder means relative to said support member, respectively, said cylinder means being operable, when actuated and when said support member is positioned in butt engagement with said wall member and frame, to react against said wall member and vehicle frame to apply pressure onto said wheel means through said structural frame thereby transferring a portion of the load from said vehicle to said wheel means and so that said vertical and horizontal movement of said dolly frame is accommodated in said swivel assembly independent of said butt engagement.

8. A detachable auxiliary load distribution assembly in combination with a vehicle-mounted mobile crane which includes a frame, said load distribution assembly comprising a dolly frame including a V-frame having generally horizontal, rearwardly diverging legs;

a pair of laterally spaced ground engaging wheels mounted on and supporting said dolly frame;

a swivel assembly, means including a box-like bracket assembly affixed to said mobile crane frame and having top, side and bottom wall members defining an opening for receiving said swivel assembly and providing interengagement between said swivel assembly and said mobile crane frame to hold said swivel assembly against movement relative to said mobile crane frame, actuating means including a pair of fluid-actuated cylinder rams each having a first end pivotally mounted on a respective one of said V-frame legs and a second end connected to said swivel assembly, said actuating means being operable, when actuated and when said swivel assembly is engaging said interengagement means, to react against said interengagement means and apply a downward force on said dolly frame and thereby transfer a portion of the load from said vehicle-mounted mobile crane to said wheels;

and said swivel assembly including a support member having opposed, generally vertical side portions, a pair of pivot members, first means pivotally mounting said pivot members on opposite side portions of said support member and defining a generally horizontal axis for vertical movement of said dolly frame relative to said vehicle-mounted mobile crane, and second means pivotally connected to a respective one of the second ends of said ram and defining a generally vertical axis for movement of said dolly frame relative to said vehicle-mounted mobile crane.

9. The assembly according to claim 8 including a pin means extending through said bracket assembly top and bottom wall members and said support member for removably connecting said swivel assembly to said bracket assembly.

10. The assembly according to claim 8 including a T-frame support assembly mounted on and extending vertically from said V-frame, said T-frame support assembly having means for adjusting the vertical height thereof so that said second ends of said rams are supported in a vertical position with said swivel assembly in general alignment with said bracket assembly opening.

11. The assembly according to claim 8 including a winch assembly supported on said V-frame, said winch assembly including means for linking said winch assembly to said mobile-crane frame whereby operation of said winch assembly pulls said dolly frame towards said mobile-crane frame.

12. The assembly according to claim 11 wherein said rams include a single acting piston and an attachment for introducing compressed air into the non-acting side of said piston.

* * * * *

UNITED STATES PATENT OFFICE
CERTIFICATE OF CORRECTION

PATENT NO. : 3,885,808
DATED : May 27, 1975
INVENTOR(S) : Philip A. Derrwaldt

It is certified that error appears in the above-identified patent and that said Letters Patent are hereby corrected as shown below:

In Claim 4, column 6, line 46, between "dolly" and "relative", the word --- frame --- has been omitted.

Signed and Sealed this nineteenth Day of August 1975

[SEAL]

Attest:

RUTH C. MASON
*Attesting Officer*

C. MARSHALL DANN
*Commissioner of Patents and Trademarks*